W. H. MILLER.
VEHICLE HEATER.
APPLICATION FILED JULY 28, 1913.
1,108,513.
Patented Aug. 25, 1914.
2 SHEETS—SHEET 1.
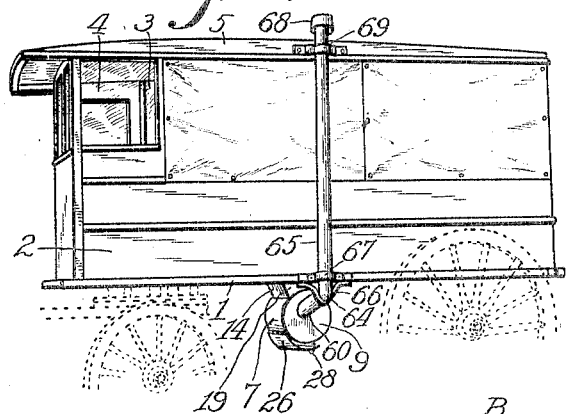
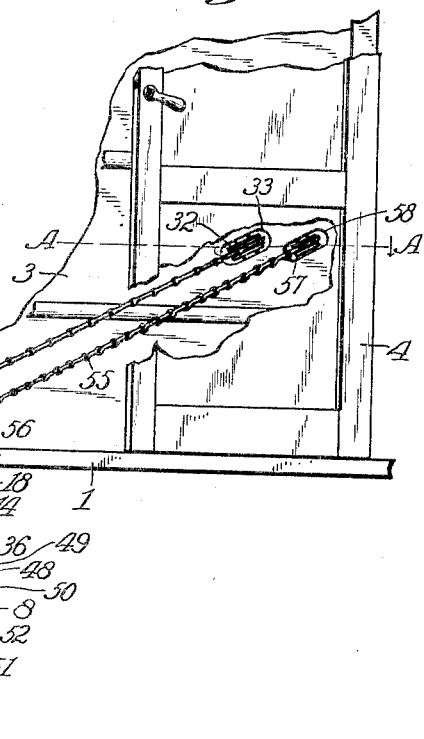
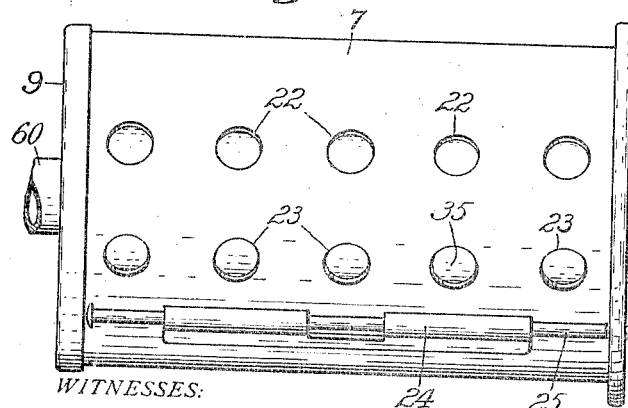
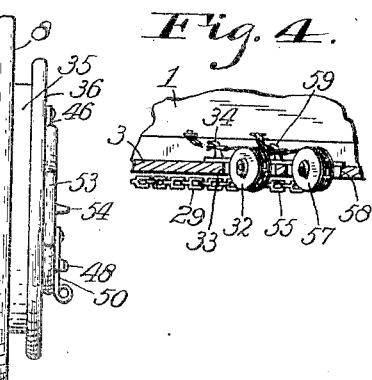
WITNESSES:
J. H. Gardner
Marie Wulfing
INVENTOR:
William H. Miller,
BY
E. T. Silvius,
ATTORNEY.

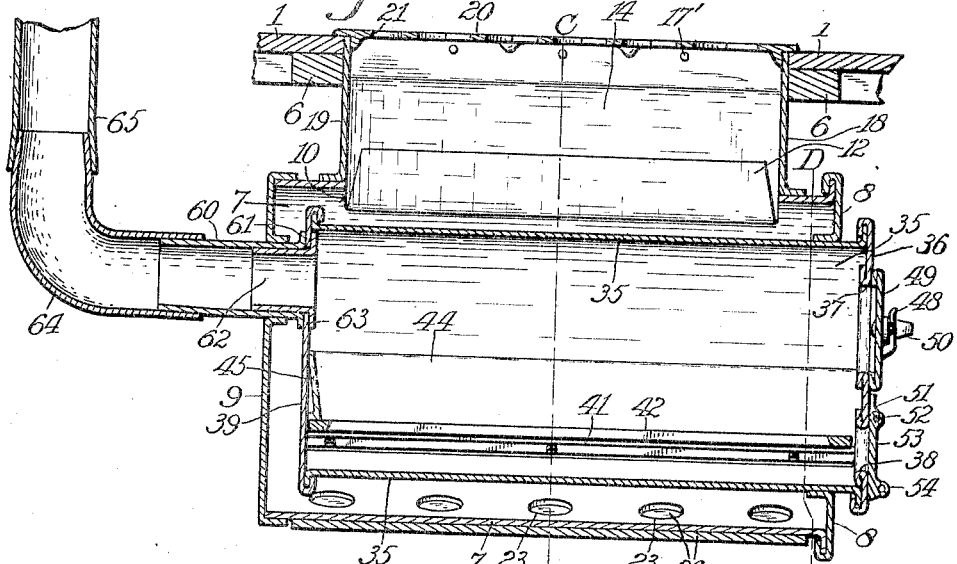
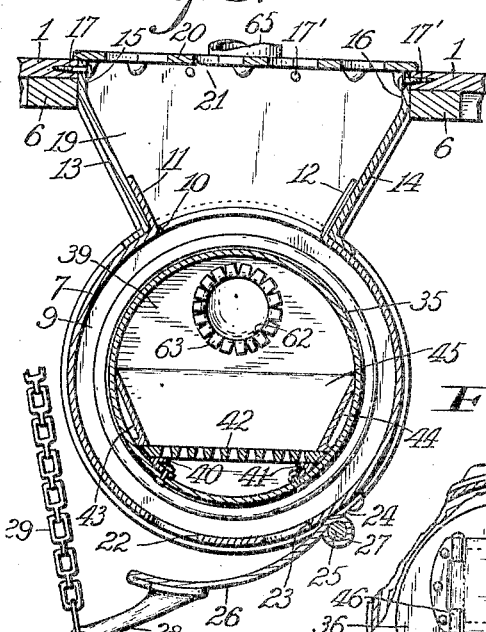
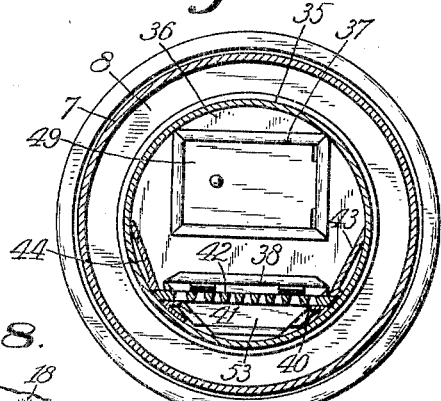
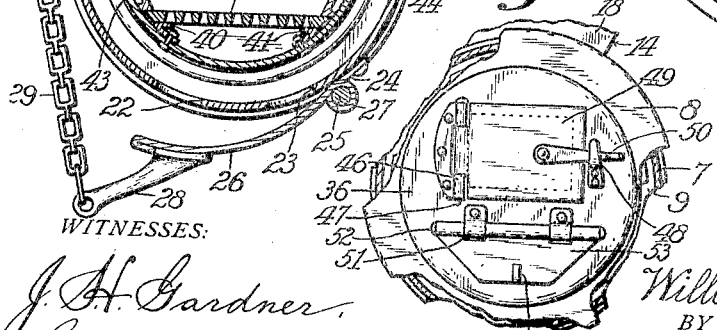
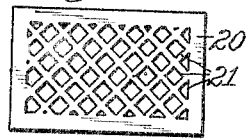

UNITED STATES PATENT OFFICE.

WILLIAM H. MILLER, OF CRAWFORDSVILLE, INDIANA, ASSIGNOR TO MILLER VEHICLE HEATER COMPANY, OF CRAWFORDSVILLE, INDIANA, A CORPORATION OF INDIANA.

VEHICLE-HEATER.

1,108,513.  Specification of Letters Patent.  Patented Aug. 25, 1914.

Application filed July 28, 1913. Serial No. 781,551.

*To all whom it may concern:*

Be it known that I, WILLIAM H. MILLER, a citizen of the United States, residing at Crawfordsville, in the county of Montgomery and State of Indiana, have invented a new and useful Vehicle-Heater, of which the following is a specification, reference being had to the accompanying drawings and to the letters and figures of reference marked thereon.

This invention relates to means for heating various types of vehicles, particularly such as are, or may be used, in rural districts, the invention having reference more particularly to means for supplying both directly radiated heat and also heated air to the vehicle.

An object of the invention is to provide an improved vehicle body and also a heater that shall be so constructed as to be applied to the vehicle body unobstructively, which heater shall be safe in operation and easily controlled.

Another object of the invention is to provide wagons, omnibusses, and the like, especially such as are designed for conveying pupils to or from school, or rural postal wagons, with a safety heater of simple and inexpensive construction, and which shall not be a menace to the occupants or the contents of the vehicle.

With the above mentioned and other objects in view, the invention consists in improved vehicle body construction, a heater combined in a novel manner with the vehicle body, and novel controlling appliances arranged and connected in an improved manner with the heater and the vehicle body.

The invention further consists also in the parts and combinations and arrangements of parts as hereinafter particularly described and further defined in the appended claims.

Referring to the drawings, Figure 1 is a perspective view of the improved body of a vehicle suitable for many purposes and provided with the improved heater; Fig. 2, a fragmentary elevation of the farther side of the vehicle body with the side door opened and swung back toward the side of the body, the door being broken away to expose the controlling apparatus of the heater; Fig. 3, an inverted plan view of the main portion of the heater minus the air-inlet regulating door; Fig. 4, a fragmentary section on the line A A in Fig. 2; Fig. 5, a vertical section of the heater on the line B B in Fig. 2; Fig. 6, a transverse section on the plane of line C C in Fig. 5; Fig. 7, a transverse section on the line D D in Fig. 5; Fig. 8, a fragmentary front elevation of the heater; and Fig. 9, a top plan of the grating or register on the top of the duct through which the heat is conducted into the vehicle body.

Similar reference characters in the various figures of the drawings indicate corresponding elements or features of construction herein referred to in detail.

In the drawings, the numeral 1 indicates the bottom, 2 and 3 the sides, 4 a door in the forward portion of one of the sides, 5 the roof and 6 a suitable floor frame extending about an opening in the floor 1 approximately in the middle portion of the floor. It should be understood that the vehicle body may be carried either on wheels or on runners and may be drawn by animals, or obviously may be motor-propelled.

In practically carrying out the objects of the invention, a suitable casing or drum 7 is provided which preferably is cylindrical and closed at its ends, one end preferably having an annular head 8 connected thereto, the opposite end having a head 9 connected thereto, adapted to permit a draft pipe to be placed therein. The drum is longer than the opening in the floor of the vehicle and is arranged below the opening, the normal upper portion of the drum having an aperture 10 therein that is approximately equal in length longitudinally to the transverse length of the opening in the floor, the drum or casing extending transversely under the vehicle body between the forward and rear wheels of the vehicle. The cylindrical portion of the drum is composed of sheet metal, and portions of the metal on opposite sides of the opening 10 are turned upward and outward flaringly to form hangers 11 and 12 to which two plates 13 and 14 are secured respectively so as to extend radially from the drum, the plates having upper parallel portions 15 and 16 respectively that are secured in opposite side portions of the frame 6 and the floor-opening by means of suitable securing devices 17 and 17', the plates constituting flaring portions of the air-outlet or distributing duct, two V-shaped plates 18 and 19 being secured respectively to the opposite ends of the plates 13 and 14 and to the drum and also in the frame 6 to complete the duct. A grating 20 or register having openings 21 therein is placed over the upper end of the duct and supported on the floor 1 of the vehicle.

The normal under portion of the casing or drum 7 has a row of air-inlet openings 22 and a parallel row of similar openings 23, the forward portion of the drum being provided with hinge devices 24 having a hinge pin 25 connected therewith. A curved regulating door 26 corresponding to the curvature of the drum has a hinge device 27 which is connected to the hinge pin 25, and when drawn against the drum the door closes all the air-inlet openings, but when it is lowered slightly, the openings nearest the hinge pin are uncovered to a less extent than the openings farther removed from the hinge connection. When the door is in partially opened position and the vehicle in motion so that air currents are produced, the door deflects the air so that the cold air and dust are not drawn directly into the air-inlet openings, the openings permitting debris from the vehicle body to escape. The door is provided with a rearwardly extending finger 28 to which a controlling device such as a chain 29 is connected for controlling the operation of the door, the device extending over guide sheaves 30 and 31 suitably supported under and by the floor 1 so as to guide the device partially under the floor and thence upwardly along one side of the body of the vehicle, the device being further guided by a sheave 32 mounted in an aperture 33 in the side of the body convenient to the position of the driver or operator of the vehicle, the inner side of the vehicle body having a hook or device 34 to which the chain 29 is adjustably connected, the driver thus being enabled to control the admission of heated air to the vehicle.

A suitable fire-box preferably comprises a hollow cylinder 35, a front 36 connected to one end of the cylinder and having a doorway 37 therein through which to insert fuel, and a doorway 38 through which to remove the ashes, a rear plate or wall 39 being connected to the opposite end of the cylinder. The cylinder 35 extends through the head 8 toward but not entirely to the head 9 of the drum or casing. The fire-box, as will be seen, extends under the distributing duct so that the latter receives the heat that may be radiated directly from the upper portion of the fire-box. The inner portion of the fire-box is provided with suitable grate supports 40 and 41, upon which a fire-grate 42 is supported.

In order to protect the cylinder 35 of the fire-box two lining plates 43 and 44 are seated upon the fire-grate and extend upward divergently to the opposite portions of the cylinder, the plates being straight so that air spaces are formed between them and the cylinders. Another lining plate 45 is seated also upon the fire-grate and extends upward at an inclination to the back head 39 between the plates 43 and 44. The front 36 is provided with a hinge member 46 having a vertical hinge pin 47, the front having also a latch-engaging device 48 thereon. A fire-door 49 is connected to the hinge pin 47 and is provided with a latch 50 that is normally detachably connected with the device 48. The front 36 is provided also with hinge members 51 to which a hinge pin 52 is connected in horizontal position and swingingly supports an ash-pit door or draft regulator 53 having a lug 54 on its free end to which a chain 55 is connected, and guided by a sheave 56 mounted on the vehicle body, the chain extending over a sheave 57 mounted in an aperture 58 in the side of the body, a hook 59 being mounted on the inner side of the body so as to be convenient to the driver for adjustably connecting the chain thereto, so that the driver may conveniently increase or check the draft for the fire. A draft pipe section 60 is secured to the back 39 of the fire-box near the upper portion in which is a suitable aperture, and it extends through a suitable aperture in the head 9, the section preferably having a flnge 61 thereon secured to the outer side of the plate 39, and preferably another section 62 is provided with a flange 63 that is secured to the inner side of the plate 39, the section 62 extending some distance into the section 60, so that the draft pipe is conveniently reinforced and is extended as may be desired, there being preferably an elbow 64 connected to the section 60, an upright pipe 65 being connected to the elbow. Preferably the elbow is supported in a hanger 66 secured to the bottom 1 of the vehicle body, a clamp 67 being secured also to the body and embracing the pipe 65, the latter extending upward to such height as may be desired, preferably as high as the roof, and provided with a suitable cowl 68, a clamp 69 being fastened to the roof and embracing the pipe.

It should be understood that the details may be variously worked out to suit requirements, as for instance, it is obvious that the front of the heater is not necessarily composed of several sheet metal parts as above described.

The drawings are not encumbered with devices that may be employed in addition to the distributing duct for supporting the apparatus securely under the vehicle body, and for the same reason means for preventing radiation of heat to the atmosphere are omitted.

Various features of the heater which may not be claimed herein form the subject-matter of a divisional application for Letters Patent, filed November 14, 1913, Serial Number 800,991.

In practical use, a fire is kindled upon the fire-grate 42, charcoal preferably being used, and the fire, and, consequently, the heat is regulated by the door or regulator 53 on proper adjustment of the chain 55. The volume of atmospheric air passing into the vehicle body is regulated by the door 26 on proper adjustment of the chain 29. The air, in passing upward around the sides of the fire-box, becomes heated and is to an extent superheated by the upper portion of the fire-box cylinder, which becomes heated to a high degree, the circulating air partaking of the directly radiated heat. Since the grating 20 is at no great distance above the fire-box, it becomes heated to a relatively high but not dangerous degree by the directly radiated heat, and is of much importance to those entering the vehicle, with cold feet, since the feet may be quickly warmed upon the grating, the grating distributing or spreading out the heated air. The furnace being provided with a relatively large fire-grate insures a high degree of heat with a relatively low rate of combustion, so that the fuel need not be frequently replenished. Debris dropped through the grating passes down and out of the air-inlet openings.

Having thus described the invention, what is claimed as new is—

1. A vehicle body including a floor having an aperture therein, a duct connected to the floor at the aperture and extending downward therefrom, a horizontal cylindrical drum having an outlet-opening in the normal upper portion thereof that is connected with the lower end of the duct, the under portion of the drum having an inlet-opening therein, a grating on the upper end of the duct supported by the floor, a curved door hinged to the under portion of the drum and extending over the inlet-opening, and a cylindrical fire-box supported in the drum clear of the cylindrical wall thereof and extending between the inlet-opening and the outlet-opening apart therefrom.

2. A vehicle body including a floor having an aperture therein, the body having a driver's station distant from the aperture, a grating on the floor extending across the aperture, a duct connected to the floor at the aperture, a cylindrical casing connected horizontally to the duct and having a row of openings in the under portion thereof, the row being arranged longitudinally of the casing, a curved deflecting door hinged to the casing on the normal forward portion thereof adjacent to the openings to swing and close the openings, a fire-box mounted in the casing between the openings and the duct, and a controlling cable guided by the vehicle body and connected to the door and extending to the driver's station.

3. A vehicle body including a floor having an aperture therein, the body having a fixed driver's station distant from the aperture, a grating on the floor extending across the aperture, a duct connected to the floor at the aperture and having two opposite sides converging downward from the floor, a cylindrical casing connected horizontally to the duct and having an opening in the under portion thereof, a fire-box mounted in the casing between the opening and the duct and having a front, a draft-door mounted on the front, and a controlling cable guided by the vehicle body and connected to the draft-door and extending to the driver's station.

4. A vehicle comprising a body having an apertured floor and also a fixed driver's station distant from the aperture in the floor, a cylindrical casing having a duct connected to the upper portion thereof and openings in the under curved portion thereof, the duct being connected to the floor at the aperture therein, said duct having two opposite upwardly diverging side portions, a grating on the floor extending across the duct, a curved door hinged to the under portion of the casing for closing the opening and having a projecting finger thereon, a cable connected to the finger and extending to the driver's station, a cylindrical fire-box supported in the casing and having a front, a draft-door hinged to the front, a cable connected to the draft-door and extending to the driver's station, two devices movably supported by the body at the driver's station to which the two cables may respectively be detachably connected, a guide supported by the body and guiding one of the cables, and another guide supported by the body and guiding the remaining cable.

5. In a vehicle, the combination of a vehicle body comprising a floor having an aperture therein, a cylindrical drum arranged below the said floor and having inlet-openings in the curved under portion thereof arranged in a row, the normal forward portion of the drum having a horizontal hinge pin thereon forward of the row of inlet openings, the upper portion of the drum having an outlet-opening therein, a duct connected with the said outlet-opening and also with the aperture of said floor, a grating on the upper end of said duct, a cylindrical fire-box in said drum, a curved regulator door connected to said hinge pin to swing and close said inlet-openings and to deflect air-currents therefrom, said door having a rearwardly extending finger thereon, and a controlling device for said door connected to said finger.

6. In a vehicle, the combination of a vehicle body comprising a floor and also upright sides, the floor having an aperture approximately in the middle portion thereof, a driver's station between the forward portions of the upright sides and above said floor, a cylindrical drum arranged below the approximate middle portion of said floor and having inlet-openings in the curved under portion thereof, the normal under portion of said drum having also a horizontal hinge pin thereon adjacent to the inlet-openings, the upper portion of the drum having an outlet-opening therein, a duct connected with the said outlet-opening and also with the aperture of said floor, a grating on the upper end of said duct, a cylindrical fire-box in said drum, a curved regulator door connected to said hinge pin to swing under the under portion of said drum and close said inlet-openings and having a finger thereon projecting under the curved under portion of said drum, a controlling chain connected to said finger and extending to said driver's station, and guide devices mounted on the vehicle body and guiding said chain.

7. In a vehicle heater, the combination of a vehicle body comprising an apertured floor and also upright sides, a cylindrical drum arranged below the approximate middle portion of said floor transversely thereto and having two longitudinal rows of air-inlet openings in the under portion thereof, the normal forward portion of the drum having a horizontal hinge pin thereon, the upper portion of the drum having an outlet-opening therein, a duct connected with the said outlet-opening and also connected with the opening of said floor, a grating on the upper end of said duct, a fire-box supported in said drum, a curved regulator door connected to said hinge pin to swing and close said rows of openings and having a rearwardly extending finger thereon, a chain connected to the finger and extending upward and externally to one of said upright sides, and sheaves mounted on the vehicle body and guiding said chain.

8. In a vehicle heater, the combination of a vehicle body comprising an apertured bottom and also two upright sides, a cylindrical drum horizontally arranged below the approximate middle portion of the said floor and having an air-inlet in its curved under portion and also an outlet-opening in its upper portion, a duct connected with the outlet-opening and also with the aperture of said floor, a cylindrical fire-box supported horizontally in the drum between the air-inlet apart therefrom and the outlet-opening and having a front thereon, said front having a draft-opening, a fire-door hinged to said front, a regulating door hinged to said front adjacent said draft-opening, a chain connected to the regulating door and extending upward exteriorly to one of said upright sides and through said side, sheaves mounted on said side and guiding said chain, and a draft pipe connected with said fire-box and extending upward exteriorly to the remaining one of said two sides.

9. In a public-highway vehicle, the combination of a vehicle body comprising a floor and upright sides, the floor having an aperture therein, a duct connected with the aperture in the floor, a cylindrical drum horizontally arranged and having an outlet-opening in the upper portion thereof connected with said duct, the under portion of the wall of the drum having an inlet-opening therein and also a horizontal hinge pin adjacent to the inlet-opening, a curved regulating door connected to the hinge pin and adapted to partially close the inlet-opening adjacent to the hinge pin more than at the farther side thereof, a grating on the top of said duct, a cylindrical fire-box centrally supported in the drum below the duct for heating air entering the inlet-openings and also radiating heat directly into the duct, a controlling device connected to the regulating door, a draft-pipe connected to the fire-box and extending beyond the drum and one of the upright sides and also upward along said side, and a device secured to the upper portion of said side and securing said draft-pipe to the side.

10. In a public-highway vehicle, the combination of a vehicle body provided with carrying wheels, two of the wheels being arranged for guiding the others, the body comprising a floor and two upright sides, the floor having an aperture therein approximately at the middle portion thereof, the forward portion of one of the two upright sides being provided with two guide devices, a distributing duct connected with the aperture of the floor, a casing arranged under the floor between the guiding wheels and the remaining wheels, the upper portion of the casing having an outlet-opening connected with the duct, the under portion of the casing having an inlet-opening therein, a regulating door hinged to the under portion of the casing to swing and partially close the inlet-opening and provided with a projecting finger, a sheave supported by said floor above said finger, a sheave supported by said one of the body sides, a cable connected to said finger and extending over said sheaves to one of said two guide devices to be movably guided thereby, a fire-box suported in the casing and provided with a draft-door, a guide sheave supported by said one of the body sides, a cable connected to said draft-door and extending over said guide sheave to the remaining one of said guide devices to be movably guided thereby, and a draft-pipe connected to the fire-box and extending beyond said casing and also upward at the outer side of the remaining one of the two sides of the vehicle body and secured thereto.

11. In a vehicle heater, the combination of a body floor having an opening therein, a cylindrical drum horizontally arranged under the floor transversely thereto and having two longitudinal rows of air-inlet openings in the under portion of the wall thereof and an outlet opening in the upper portion of the wall, a duct connected with the outlet opening and also with the opening in said floor, a curved regulating door hinged to the under portion of the wall of the drum and adapted to partially close the air-inlet opening of one of the two rows and permit the inlet openings of the remaining one of the rows to be in full communication with the atmosphere, a cylindrical fire-box centrally supported in the drum below the duct for heating air entering the inlet openings and also radiating heat directly into the duct, and a cable connected to the door and provided with a guide supported under the said floor.

In testimony whereof, I affix my signature in presence of two witnesses.

WILLIAM H. MILLER.

Witnesses:
  CHASE HARDING,
  FRED F. DOHERTY.